INVENTOR.
Robert B. Pealer
BY
Bates, Teare, & McKean
ATTORNEYS

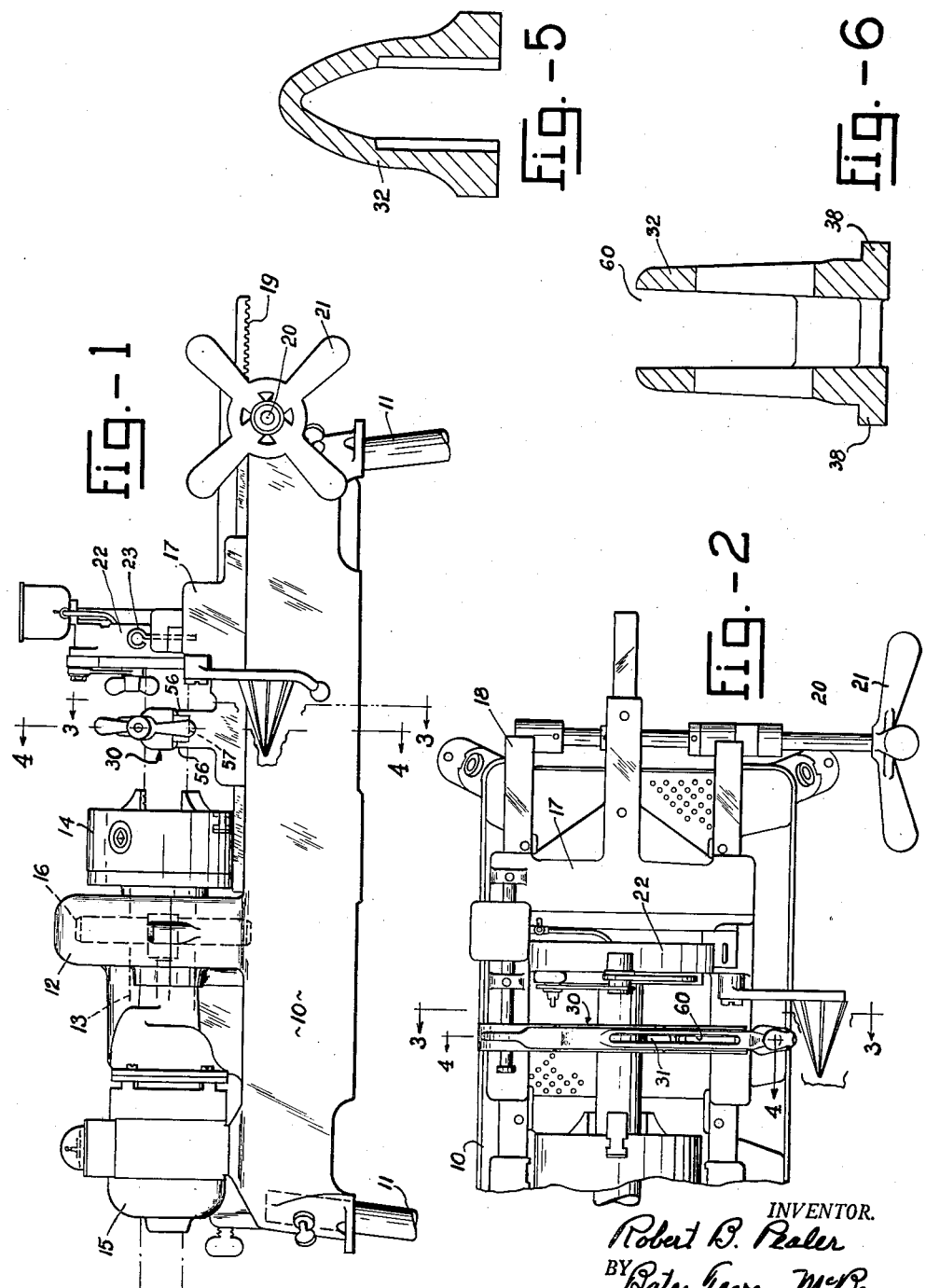

United States Patent Office 2,966,819
Patented Jan. 3, 1961

2,966,819
PIPE WORKING TOOL

Robert B. Pealer, Garrettsville, Ohio, assignor to Beaver Pipe Tools, Inc., Warren, Ohio, a corporation of Ohio Filed Jan. 15, 1957, Ser. No. 634,367

1 Claim. (Cl. 82—93)

This invention relates to a pipe working tool and particularly to a power driven pipe or conduit cutting tool. These therefore are the general objects of the invention.

A more specific object of the invention is to provide a pipe working tool having a pipe cutter arranged and supported to facilitate cutting pipe to predetermined lengths with a high degree of accuracy, and the support for which carries a power driven mechanism to rotate the pipe in accurate alignment with the cutter, the arrangement of the cutter being such that the surface of the pipe in the immediate region of the cut is readily visible to the operator.

Other objects and advantages of the invention will become more apparent from the following description of an embodiment of the invention shown in the accompanying drawings in which:

Fig. 1 is a side view of a pipe cutting machine constructed in accord with the present invention;

Fig. 2 is a top view of the right hand portion of the machine shown in Fig. 2 having an improved cutter in position thereon;

Figure 3:
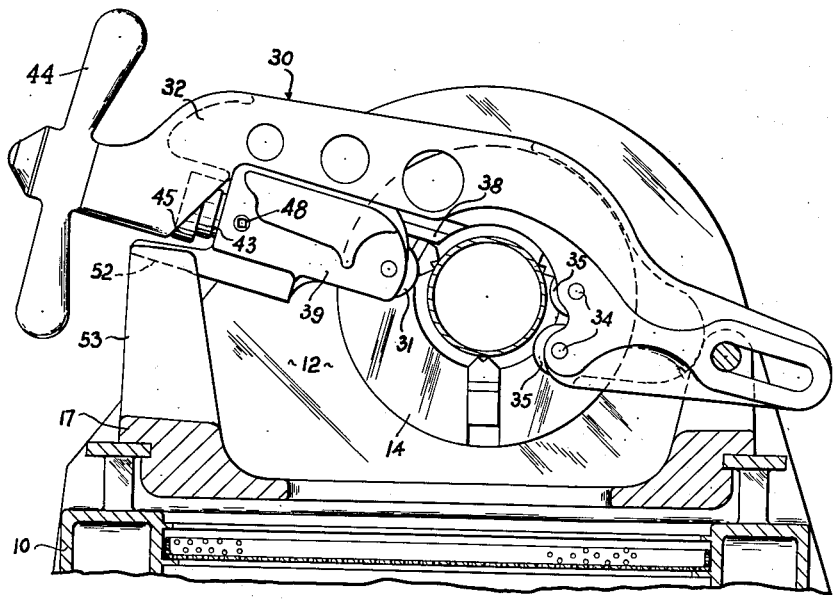
Fig. 3 is an enlarged transverse sectional view illustrating the cutting tool in elevation, the plane of the section being indicated by the lines 3—3 on Figs. 1 and 2.
Figure 4:
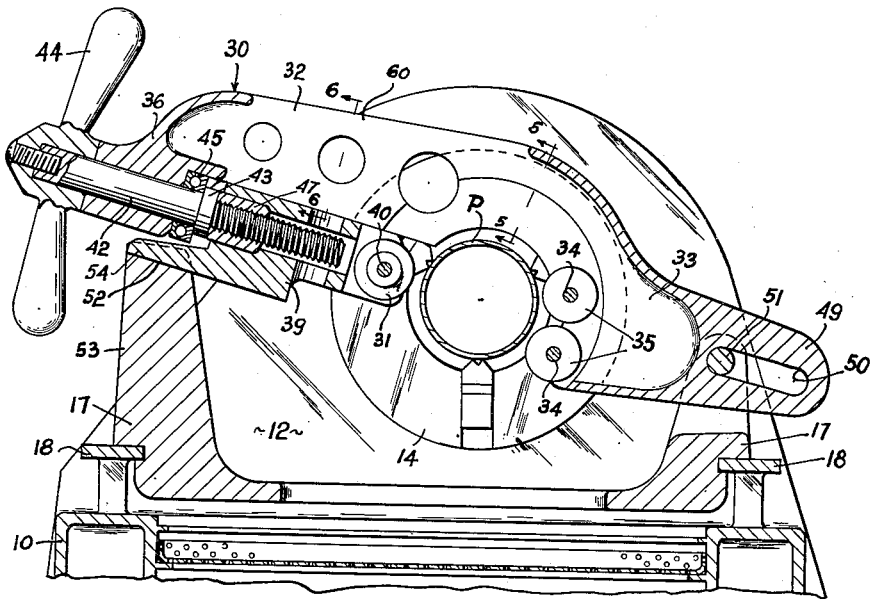

Fig. 4 is a sectional view similar to Fig. 3 but taken through the center of the cutting tool, the plane of the section being indicated by the lines 4—4 of Figs. 1 and 2; and Figs. 5 and 6 are enlarged sectional details of the cutting tool frame, the planes of the sections being indicated by correspondingly numbered lines on Figs. 3 and 4.

As illustrated in Fig. 1, 10 indicates a suitable bed supported by legs 11 and provided with an upstanding housing 12 in which the barrel 13 of a rotatable chuck 14 is mounted. This chuck is driven by a motor 15 secured to the bed 10 and drivingly connected with the chuck barrel by suitable reduction gearing, a portion of which is indicated at 16. A shiftable carriage 17 is slidably mounted on suitable way 18 formed on the bed 10 for movement to and from the face of the chuck 14. This carriage is provided with a rack 19 which coacts with a pinion, not shown, but which is carried by a cross shaft 20 journaled in the bed 10, and provided with an operating handle 21. If desired suitable pipe threading tool 22 may be removably mounted on the carriage 17 and retained in position by pins, one of which is shown at 23. Such threading tool may be constructed similar to that shown in Patent No. 2,266,508, issued to Beaver Pipe Tools, Inc., December 16, 1944. The construction of such threading tool is such that the threading dies thereof may be withdrawn so that pipe gripped by the chuck 14 may extend freely through the ring-like threading tool without contacting its withdrawn threading dies. If desired the entire threading tool may be removed by withdrawal of the pins 23.

In the pipe working machine of the present invention, a pipe cutting tool 30, having a retractable cutter 31, is mounted on the carriage 17 intermediate the chuck 14 and the threading tool 22. This cutting tool being so mounted permits the end of the pipe to be threaded, the threading dies retracted and the cutters moved into cutting position rapidly and accurately.

The cutting tool of the present invention, generally indicated at 30, includes an elongated C-frame 32, one end 33 of which is bifurcated and is provided with a pair of transverse parallel openings to receive pins 34 which support respective pipe engaging rollers 35. These rollers are spaced from each other and face inwardly of the frame 32. When in position on the carriage 17 these rollers have their axes parallel with the axis of rotation of the chuck 14. The other leg 36 of the frame 32 carries a block 39 which is slidable to and from the rollers 35.

The block 39 slides in ways 38 formed on the frame 32 and its inner end is provided with a spindle 40 which carries the pipe cutting wheel 31. The axis of the spindle 40 is parallel with the axes of the rollers 34 so that the cutting wheel and rollers may coact with a workpiece or pipe "P" interposed therebetween to effect the desired cut consequent upon the application of pressure to the block and rotary movement to the pipe.

Pressure on the block 39 is applied by manual rotation of a rod 42 which is journaled in the frame 32 with its extended axis passing through the axis of the cutting wheel 31 and midway between the axes of the rollers 35. The ways 38 which guide the block 39 are parallel with the axis of the rod 42. Axial movement of the rod 42 is prevented by a shoulder 43 formed on the rod and an operating handle 44 which is secured to the outer end of the rod. A suitable anti-friction bearing 45 is interposed between the shoulder 43 and the adjacent surface of the frame 32 to facilitate rotation of the rod 42 under operating conditions.

The inner end of the rod 42 projects into the block 39 and is provided with external threads which coact with threads formed in a sleeve 47 secured to the block as by set screws, one of which is shown at 48.

The cutting tool 30 is supported on the carriage so that the extended axis of the rod 42 intersects the axis of rotation of the chuck 14 and workpiece "P" carried thereby. As shown in Figs. 3 and 4, the right hand end 33 of the frame 32 is provided with an extension 49 having an elongated slot 50 extending transversely therethrough. The walls of the slot 50 are parallel with the axes of the rollers 35, and its longitudinal center line is coincidental with the extended axis of the rod 42. A tool supporting rod 51 secured to the carriage 17 passes through the slot 50, thereby supporting one end of the tool 30. The other end of the tool abuts an upwardly facing surface 52 of a standard 53 formed integral with the carriage 17. The supporting surface 52 is engaged by a shoe 54 formed integrally with the block 39. The coacting planar surfaces of the shoe and block are parallel with the axis of the rod 42 of the cutting tool and with the longitudinal center line of the slot 50. The arrangement is such the tool is free to move axially relative to the axes of the rod 42 but is prevented from rotary movement relative thereto by the supporting rod 51 assisted by the planar surfaces 52. When the tool is in cutting position movement axially relative the pipe "P" is prevented by the side walls 56 (Fig. 1) of the recess 57 into which the shoe 54 seats.

One of the features of the present invention is the arrangement whereby accurate positioning of the cutting tool axially relative to workpiece is accomplished. For this purpose the frame or body 32 of the cutting tool is provided with an elongated slotted opening 60 which, as shown in Fig. 2 extends normal to the axis of the workpiece and through which both the line of cut on the workpiece and the cutting wheel 31 are visible to the operator. Thus the operator may mark the workpiece to indicate the line of cut and then move the carriage 17 until the cutting wheel 31 and the mark as viewed through the slotted opening 60 are in accurate registration.

The cutting tool may be readily swung to an inactive position by merely moving it toward the left (Figs. 3 and 4), until the supporting bar 51 engages the right hand end of the slot 50 and then swinging the entire tool clockwise about the axis of such bar (Figs. 3 and 4).

I claim:

A pipe cutting machine, comprising a base having a rotatable chuck thereon for gripping and rotating a pipe about its longitudinal axis, a carriage mounted on said base and movable toward and away from said chuck, a frame having a wide face and relatively narrow width pivotally mounted edgewise of one side of said carriage and extending transversely thereof, said frame including a block supported by the opposite side of said carriage and having a rotatable cutter disc mounted thereon, a recess entering from the bottom edge portion of said frame to provide clearance for said pipe, a pair of vertically spaced rollers journaled on said frame and extending at their peripheries into said recess to provide back-up means for said pipe when engaged by said cutter disc, screw means engageable with said block for sliding the latter on said carriage and relative to said frame toward said pipe to sever a predetermined portion therefrom, and a vertically disposed recess entering from the top edge of said frame and extending through the lower edge thereof, said recess being at least as long as the length of movement of said block to expose said cutter disc to view from directly above said frame in any adjusted position of said block, whereby said cutter disc may be accurately aligned with a cut-off mark on said pipe.

References Cited in the file of this patent

UNITED STATES PATENTS

| | | |
|---|---|---|
| 967,636 | Hewitt | Aug. 16, 1910 |
| 2,032,384 | West | Mar. 3, 1936 |
| 2,079,179 | Pealer | May 4, 1937 |
| 2,314,016 | Peters | Mar. 16, 1943 |
| 2,487,327 | Ganter | Nov. 8, 1949 |
| 2,768,550 | Ingwer | Oct. 30, 1956 |
| 2,900,858 | Gauthier et al. | Aug. 25, 1959 |